(12) United States Patent
Nagler et al.

(10) Patent No.: US 7,549,384 B2
(45) Date of Patent: *Jun. 23, 2009

(54) MOTORWELL THROUGHHULL

(75) Inventors: Wylie Davin Nagler, Osprey, FL (US);
Erle Matthew Bridgewater, St. Johns, FL (US)

(73) Assignee: GEM Products, Inc., Orange Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/888,120

(22) Filed: Jul. 31, 2007

(65) Prior Publication Data

US 2009/0031938 A1 Feb. 5, 2009

(51) Int. Cl.
*B63B 19/26* (2006.01)

(52) U.S. Cl. .................. 114/182; 114/343; 114/183 R

(58) Field of Classification Search ............... 114/151, 114/173–180, 183 R, 184, 185, 197, 198, 114/182; 210/166, 232, 238; D15/138; 4/679–694; 285/189–222, 38; 411/427–438
See application file for complete search history.

(56) References Cited

U.S. PATENT DOCUMENTS

| | | | | |
|---|---|---|---|---|
| 1,866,643 A | * | 7/1932 | Greear | 114/197 |
| 2,990,798 A | * | 7/1961 | Pribyl | 114/183 R |
| 3,011,468 A | | 12/1961 | O'Gara | |
| 3,060,882 A | * | 10/1962 | Peters et al. | 114/185 |
| 4,304,252 A | * | 12/1981 | Stanton | 137/240 |
| 6,089,933 A | * | 7/2000 | Cotton | 440/88 M |
| 6,241,440 B1 | * | 6/2001 | Orlebeke | 410/106 |
| 6,736,081 B1 | | 5/2004 | Green et al. | |
| 6,902,666 B1 | * | 6/2005 | Foronda, Jr. | 210/167.25 |
| D574,863 S | * | 8/2008 | Nagler et al. | D15/138 |

* cited by examiner

*Primary Examiner*—Ed Swinehart
(74) *Attorney, Agent, or Firm*—Seyfarth Shaw LLP

(57) ABSTRACT

A motorwell throughhull is disclosed having a central portion for threadably receiving end caps or securements thereon. The central portion is sizable, such as by being formed of a material that is easily cut such as plastic. The end caps may be formed of metal to provide a desirable aesthetic appearance.

2 Claims, 3 Drawing Sheets

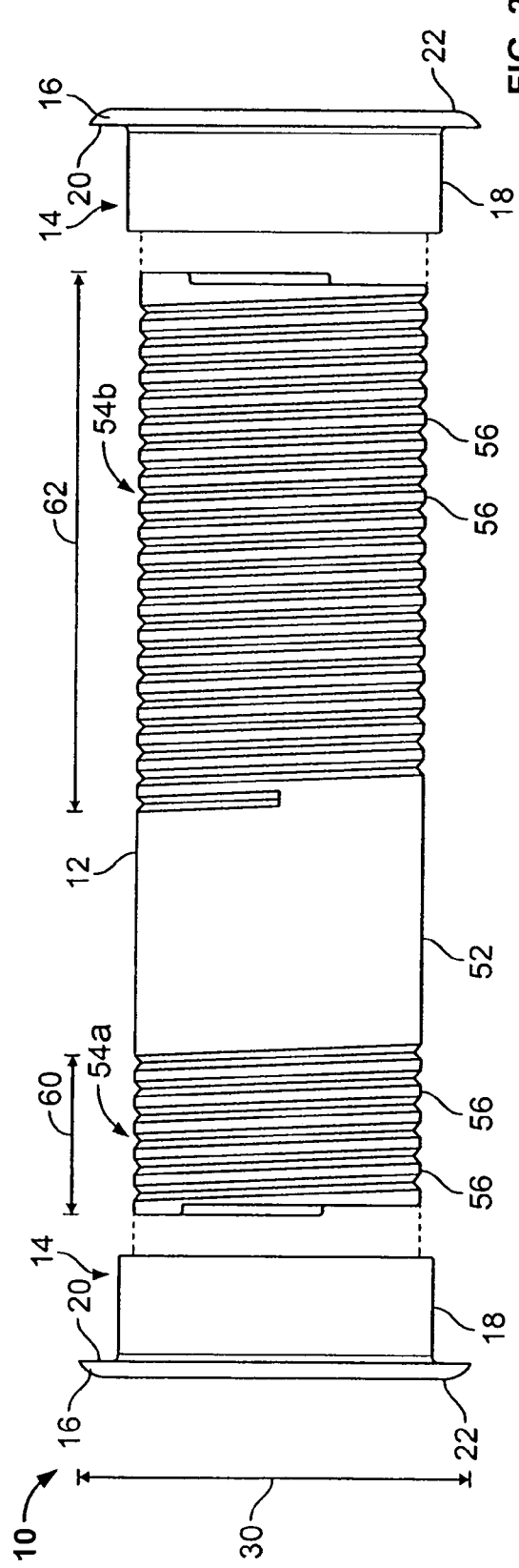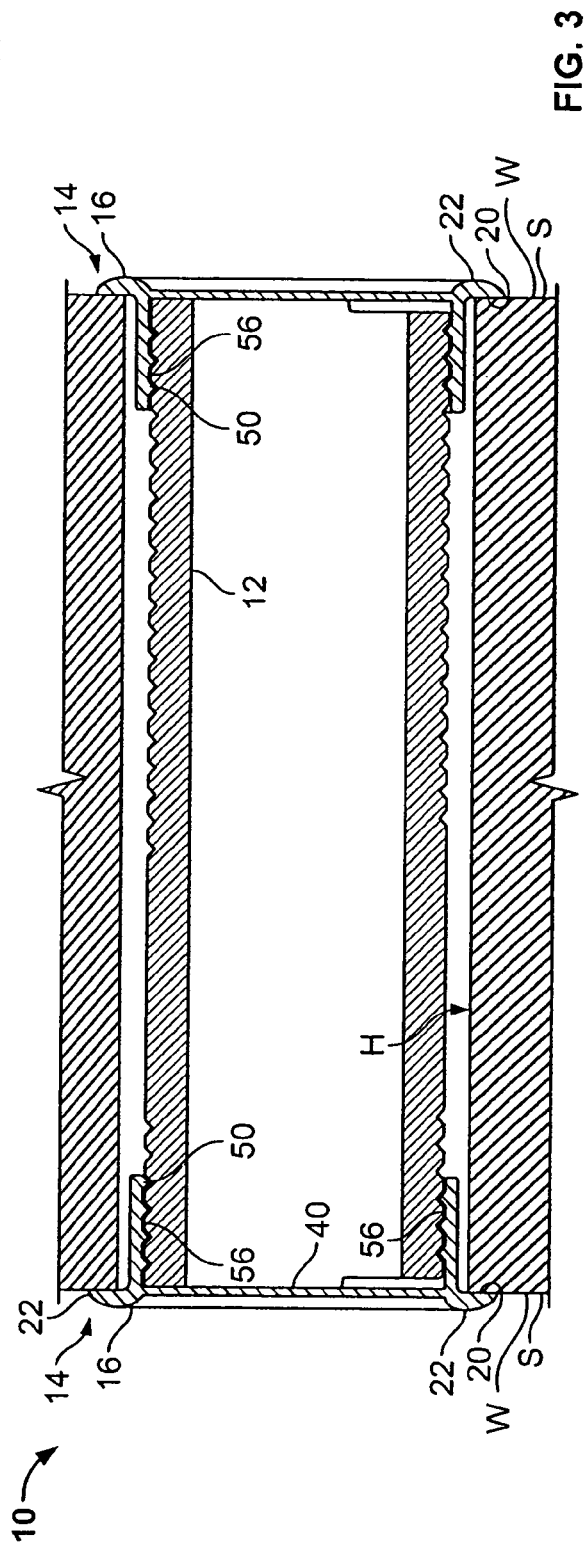

MOTORWELL THROUGHHULL

CROSS-REFERENCE TO RELATED APPLICATION

The present application is related to U.S. Design patent application Ser. No. 29/289,769, titled "Motorwell Throughhull," filed Jul. 31, 2007, now U.S. Pat. No. D574,863.

FIELD OF THE INVENTION

The invention relates to throughhulls for boats and water crafts and, in particular, to a throughhull for a motorwell that is sizable for a variety of hull or bulkhead walls.

BACKGROUND

In basic terms, a motorwell throughhull is a drainage pipe for the motorwell. Many engines utilize water as a coolant, and the coolant system may leak. Additionally, being in a marine environment, it is obviously just difficult to maintain a dry compartment for an engine or motor that transmits power to an external propeller or screw. Typically, a motorwell throughhull is used in the engine mount area of an outboard engine, an area that is particularly accessible by and prone to water entering.

The motorwell is separated from the exterior of the boat by a hull or by a bulkhead partition. The motorwell throughhull drains water or small debris that is in the motorwell to an exterior of the boat. Most motorwell throughhulls for smaller pleasure craft are not equipped with pumps so that the motorwell throughhull relies on gravity to drain the water from the motorwell. Therefore, the motorwell throughhull is exposed above the water line, and aesthetics combined with function are important to many boating enthusiasts.

The current industry standard for a motorwell throughhull is a brass tube having flared ends and an open passage between the ends. The brass tube is inserted through the hull and at least one of the ends is then flared after the insertion in order to mount the device. Alternatively, one end may be provided with a nut to secure the hull between the nut and the opposite flared end.

There are several common problems with the brass tube design. As the passage therethrough is open, the tube is susceptible to clogging by debris. Brass may provide a desirable aesthetic, and is soft enough that it may be readily flared during installation. However, brass is expensive and easily discolors and tarnishes in the marine environment.

Another problem is that the brass tube is sized for a particular hull thickness. Accordingly, a parts supplier or retailer needs to stock a slew of the brass tube design motorwell throughhulls having different lengths. This can also lead to problems where a particular motorwell throughhull is not exactly sized to the hull thickness, and, thus, the motorwell throughhull does not exactly fit: water can penetrate the interior of the hull if the motorwell throughhull is too long, and an improperly fitting motorwell throughhull can be unattractive as well as an obstacle.

U.S. Pat. No. 6,736,081, to Green, et al., describes a variety of general throughhulls or bilge fixtures. In one form, a central portion is provided with a flared end and a threaded end, the threaded end receiving a nut thereon. As these designs are generally for bilge pumping or other outlets, they contemplate having a tube or pipe connected to an interior end. To facilitate such connection, a number of the designs utilize a barbed or pronged inner end extending beyond the threaded end portion that receives the nut. In any event, using such throughhulls in a motor well likely would result in the threaded end portion protruding from the hull or bulkhead in an unattractive manner, may be an obstacle for persons in the boat, and may extend to a point above the water line within the compartment to be drained.

In another known design, a motorwell throughhull is provided with a central portion and a pair of stainless steel end caps that are press-fit onto the ends of the central portion. Certainly stainless steel caps are likely to be found more attractive than discolored brass, and the pressfitting gives the motorwell throughhull a clean appearance. The central portion is formed of plastic and has no threads formed thereon, which allows an installer to selectively size the central portion with respect to the thickness of the hull. However, pressfitting is a process that is more difficult than the average person would find simple threading, and it is difficult to pressfit the caps so that they are flush with the hull.

Accordingly, there has been a need for an improved motorwell throughhull.

SUMMARY

In accordance with an aspect, a motorwell throughhull is disclosed having a central portion having a first end having a first extent of threading thereon, and a second end having a second extent of threading thereon, a first securement receivable on the first end and having internal threading for receiving at least a portion of the threading of the first end, and a second securement receivable on the second end and having internal threading for receiving at least a portion of the threading of the second end.

The first and second securements may have at least an external surface of metal providing an aesthetic look. The central portion may be sizable with respect to a boat hull thickness. The central portion may be sizable by removing a portion from one of the ends thereof. The first extent of threading may be greater than the second extent of threading, and the central portion may be sizable by removing the portion from the first end thereof. Each securement may include a restricting structure for restricting ingress therethrough of large matter. The restricting structure may include a cross bar mounted diametrally across the securement. Each securement may include a gripping structure for securing the securement with the central portion. The gripping structure may include a cross bar mounted diametrally across the securement.

In another aspect, a throughhull for draining a motorwell of a boat is disclosed including a central portion formed of plastic and having first and second ends, and first and second securements securable on the respective first and second ends of the central portion, the securements being formed of metal, the central portion having external threading on each of the first and second ends, and the first and second securements having internal threading for receiving the external threading of the central portion.

The first end external threading may be greater in extent than the second end external threading. The throughhull may be sizable by removing a portion of the central portion at the first end.

In a further aspect, a method of mounting a motorwell throughhull on a partition of a boat for draining a compartment is disclosed including providing an opening through the partition, measuring the length of the opening in the partition, sizing a central portion for receipt within the opening in the partition, inserting the central portion within the opening, threading a first securement onto a first end of the central portion, threading a second securement onto a second end of the central portion, and advancing the threading of the securements onto the ends to mount the securements with the partition.

The step of sizing may include removing a portion of the central portion. The step of advancing the threading may include gripping a structure within the securement and rotating the securement relative to the central portion. The method may include the step of forming the central portion of plastic material. The method may include the step of forming the securements of metal material. The step of sizing may include providing the central portion with a length such that the central portion ends are recessed from outer openings of the securements when mounted with the partition.

BRIEF DESCRIPTION OF THE DRAWINGS

In the Figures.

FIG. 2 is a side view of the central portion and securements showing threaded connections allowing the throughhull to be installed on a hull having a range of thicknesses;

FIG. 3 is a side elevation view in cross-section of the throughhull secured with and through the hull of the boat.

DETAILED DESCRIPTION

Figure 1:
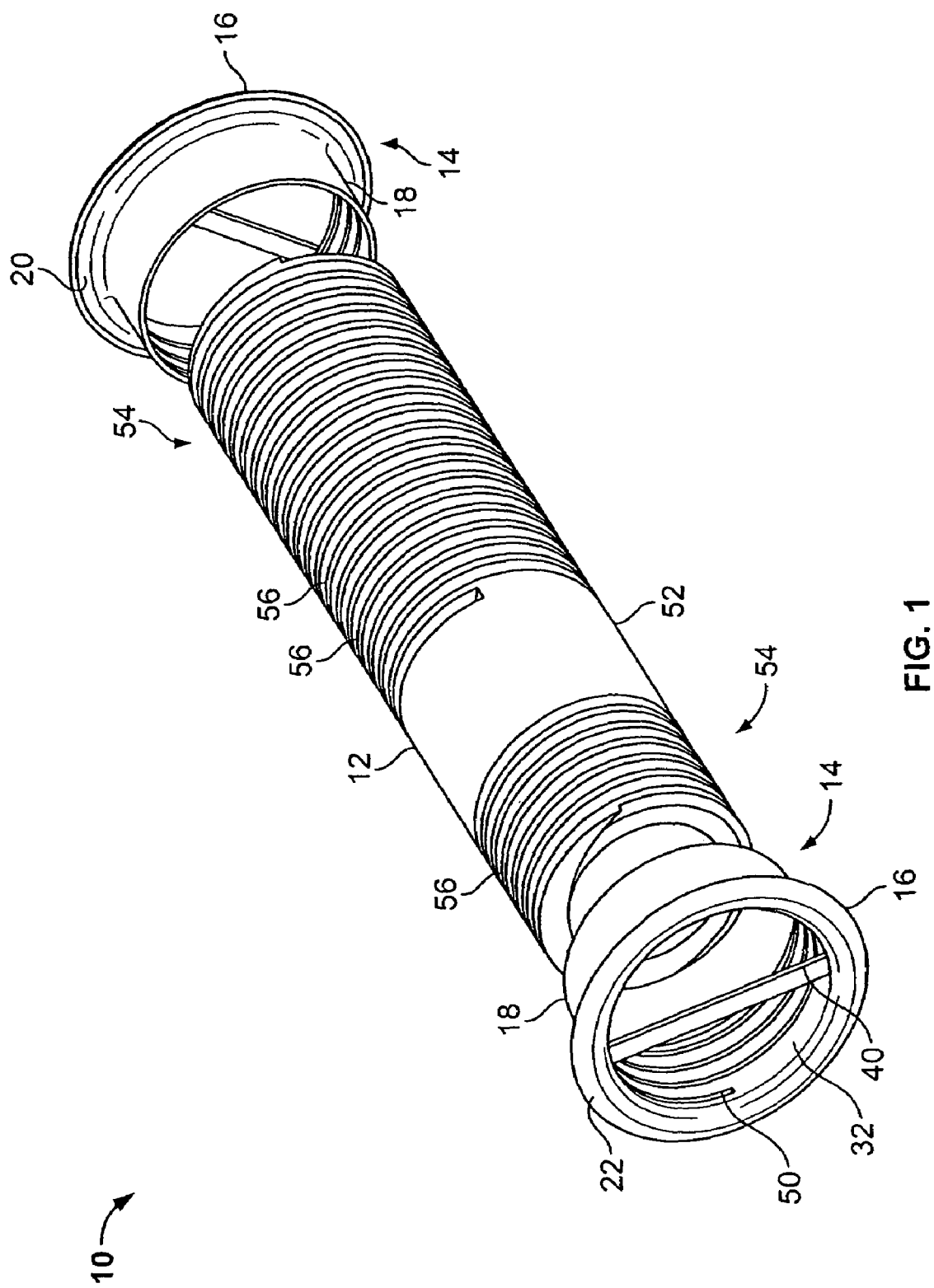
FIG. 1 is an exploded perspective view of a throughhull of the present invention showing a central nipple portion for extending from an compartment within a boat to an exterior of the boat by passing through a hull of the boat, and a pair of end securements for securing the central portion with an interior surface in the compartment and an exterior surface.

Referring initially to the Figures, a throughhull 10 is shown for use with a boat and, in particular, use as a throughhull for a motorwell of a boat to allow drainage therefrom and, more particularly, a throughhull for an engine area of a boat equipped with an outboard engine. As is known in the art, a throughhull 10 for a motorwell as shown and described herein may be used as a throughhull for other compartments or areas of the boat; however, this type of throughhull is not typically connected with another device or apparatus, and is thus typically not provided with the connection structure that other types of throughhulls likely would have.

Instead, the motorwell throughhull 10 is provided to allow passive drainage, principally aided by gravity, of an area or compartment that provides a mounting area for an engine and a staging area for the operation of that engine. The motorwell throughhull 10 is in an area in which an operator of the boat, or a service person or the like, may physically attempt to access, and the area is often in full view. Accordingly, the motorwell throughhull 10 is designed not to provide any impediments in the area or compartment, and is designed to have a clean, attractive, desirable look or aesthetic.

Towards this end, the motorwell throughhull 10 is designed so as to be properly sized to a wide range of hull or bulkhead or partition wall thicknesses. In the prior art, it is common to install a motorwell throughhull that is not sized for the wall thickness. The prior art design having flanges on both ends may have one or both flanges not flush with the wall surfaces to which the motorwell throughhull is mounted, or may simply have a nut/threaded end arrangement so that the nut and an opposite flanged end can be tightened to the wall surfaces. Both of these prior art approaches are unaesthetic, the first design is difficult to seal with the wall and water may enter into the wall itself, and the second design is an impediment to access.

In order to allow the motorwell throughhull 10 to be sized properly and to be aesthetically pleasing, it is provided with a central portion 12 in the form of a threaded nipple structure, and first and second end securements 14 or caps. Each of the securements 14 is preferably of a marine grade material and, most preferably, is polished stainless steel to provide a quality aesthetic, though a colored lacquer, for instance, may be applied to give the appearance of another metal without degrading the properties of the securements 14.

Each of the securements 14 includes a flange portion 16 that radially flares outwardly from a tube portion 18. The flange portion 16 has a rear annular face 20 formed around the tube portion 18, the face 20 being substantially flat so as to provide close abutment with a wall W (see FIG. 3) to which it is secured. The flange portion 16 also has a front surface 22 which is rounded or radiused to provide a smooth, low profile with a surface S of the wall W, and the rounded surface 22 extends from an outer diameter 30 of the flange portion 16 into the tube portion 18 so as to blend smoothly with an interior surface 32 of the tube portion 18.

Each securement 14 is preferably provided with a debris restrictor, shown in the present embodiment in the form of a diametrally extending bar 40 extending within and from one side of the flange portion 16 to another. Alternatively, the bar 40 may be located so as to be positioned on the front surface 22 of the flange portion 16, or within the tube portion 18, as well as be of a different shape or construction such as crosshairs. The bar 40 serves to prevent large debris from entering the motorwell throughhull 10 where it may become lodged. Additionally, a screen or other restriction structure (not shown) may be mounted on or in the motorwell throughhull 10. The bar 40 may also be used for installation of the securements 14 by providing a grip from rotating the securement 14 as it is being threaded onto the central portion 12, the bar 40 being located at an opposite end of the securement passage from wherein the central portion 12 is received.

In order to install the motorwell throughhull 10, a hole H (see FIG. 3) is provided in the wall W, which may be a hull or partition or bulkhead structure in a boat. The central portion 12 is first inserted within the hole H, and then the securements 14 are attached thereto, though one of the securements 14 may be preset or attached to the central portion 12 prior to inserting the central portion 12 within the hole H.

To attach the securements 14 to the central portion 12, cooperating threads are provided. The tube portion 18 of each securement 14 is provided with internal threads 50, while an exterior surface 52 of the at least the ends 54 of the central portion 12 have external threads 56, as best seen in FIG. 2. Accordingly, the securements 14 are threaded onto the central portion ends 54 so that the central portion 12 extends inside of the tube portion 18 of the securements 14. This allows the flange portion rear face 20 to sit substantially flush against the wall surface S, and the tube portion allows 18 purchase between the threads 50, 56, yet does not result in the central portion 12 protruding from the face 22 of the securements 14. When secured, the tube portion 18 extends into the hole H, and thus the overall size of the motorwell throughhull 10 is adjustable by varying the degree to which the central portion 12 is received in the tube portions 18, and, again, the central portion 12 need not protrude from the securements 14. This provides an aesthetic appearance, and, more importantly, maintains the low profile of the motorwell throughhull 10 in general, while also allowing the varying thicknesses of the motorwell wall.

The motorwell throughhull 10 as described allows the securements 14 to be precisely fitted onto the wall W. However, the wall W may vary in thickness in a degree greater than the extent of the tube portion threads 56. Heretofore, this has required a variety of sizes to be stocked by a supplier or distributor, and requires an installer to have a relatively accurate idea of the thickness of the wall W to which the motorwell throughhull is to be secured. To address this issue, the central portion 12 is designed to be selectively sized so that a number of stock sizes may be provided and, to the extent a particular size is too long for the hole H in the wall W so that the central portion 12 would extend from the securements 14, the central portion 12 may be reduced in length.

Figure 4:
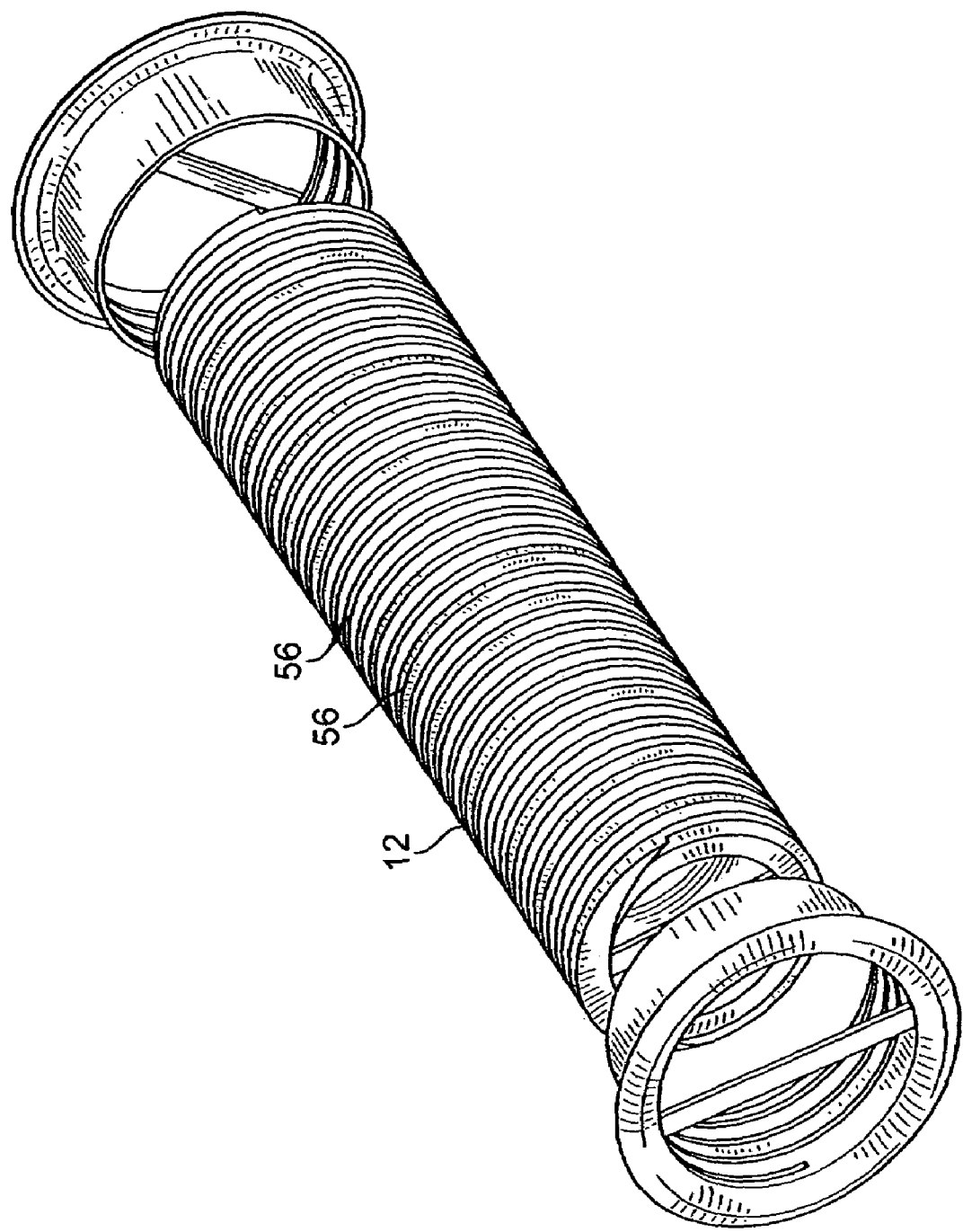
FIG. 4 is a perspective view of an alternative form of a throughhull of the present invention showing the central nipple portion having threading over substantially its entire length.

To achieve this, the central portion 12 is preferably formed of a relatively easy-to-cut and inexpensive material, as an expensive material would be undesirably wasted if the central portion 12 were reduced in length. In a preferred form, the central portion 12 is formed of polyvinyl chloride, commonly referred to as PVC, selected for its ability to flex, its ability to be threaded and retain quality thread shape with strong purchase, and its lack of chemical or environmental sensitivity. As shown in FIG. 2, a first end 54a of the central portion 12 has threads 56 over a short extent 60 thereof, and a second end 54b has threads 56 over a longer extent 62 thereof. If it is desirable to shorten the central portion 12, the second end 54b may be cut to have a portion thereof removed, while the longer extent of threads 62 is still able to be joined with the securements 14 despite the portion being removed. In an embodiment shown in FIG. 4, threads 56 may extend along the entire length of the central portion 12.

The present motorwell throughhull 10 is simple to install in a proper manner, easy to be sized, provides a clean aesthetic and advantageous low profile, is environmentally resistant, and resists debris from entering thereinto.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A motorwell throughhull comprising:
   a central portion having a first end with threading thereon and a second end with threading thereon;
   a first securement having a first tube portion including internal threading for receiving at least a portion of the threading of the first end and a first flange extending radially from the first tube portion, the first securement having a low profile defined by the flange and a first gripping structure disposed within the first tube portion that includes a cross bar mounted diametrically across the first securement for threading the first securement with the first end; and
   a second securement having a second tube portion including internal threading for receiving at least a portion of the threading of the second end and a second flange extending radially from the second tube portion, the second securement having a low profile defined by the flange and a second gripping structure disposed within the second tube portion that includes a cross bar mounted diametrically across the second securement for threading the second securement with the second end.

2. A method of mounting a motorwell throughhull on a partition of a boat for draining a compartment, the method including:
   providing an opening through the partition;
   sizing a length of a central portion for receipt within the opening in the partition, the central portion having a first end having threading thereon, and a second end having threading thereon;
   inserting the central portion within the opening;
   threading a first securement onto a first end of the central portion, the first securement having a first tube portion including internal threading for receiving at least a portion of the first end and a first gripping structure disposed within the first securement tube portion that includes a cross bar mounted diametrically across the first securement for threading the first securement with the first end;
   threading a second securement onto a second end of the central portion, the second securement having a second tube portion including internal threading for receiving at least a portion of the threading of the second end and a second gripping structure disposed within the second securement tube portion that includes a cross bar mounted diametrically across the second securement for threading the second securement with the second end; and
   advancing the threading of the first and second securements onto the respective first and second ends to mount the first and second securements with the partition.

* * * * *